United States Patent [19]

Survant

[11] 4,318,625
[45] Mar. 9, 1982

[54] STEPPER MOTOR LOAD TUNING

[75] Inventor: Thomas G. Survant, Lexington, Ky.

[73] Assignee: International Business Machines Corporation, Armonk, N.Y.

[21] Appl. No.: 191,593

[22] Filed: Sep. 29, 1980

[51] Int. Cl.³ .................. B41J 19/30; G05B 19/40
[52] U.S. Cl. .............................. 400/322; 400/53; 400/328; 400/903; 318/696; 318/129
[58] Field of Search ............. 400/53, 144.2, 320, 400/322, 328, 719, 903; 318/6, 114, 129, 160, 685, 696; 310/80

[56] References Cited

U.S. PATENT DOCUMENTS

| | | | |
|---|---|---|---|
| 2,989,166 | 6/1961 | Walker et al. ............... | 400/53 |
| 3,133,620 | 5/1964 | Okcuoglu et al. ........... | 400/53 |
| 3,224,545 | 12/1965 | Hanft .......................... | 400/53 |
| 3,642,109 | 2/1972 | Cappotto et al. ............ | 400/53 |
| 3,947,742 | 3/1976 | Van Acker ................... | 318/685 X |
| 3,951,249 | 4/1976 | Nerbas et al. ............... | 400/53 X |
| 4,024,447 | 5/1977 | Epstein ........................ | 400/320 X |
| 4,100,471 | 7/1978 | Pritchard .................... | 318/685 |
| 4,203,680 | 5/1980 | Mitrovich ................... | 400/320 X |
| 4,208,141 | 6/1980 | Jagger ........................ | 400/320 X |
| 4,276,498 | 6/1981 | Stager et al. ................ | 318/6 |

FOREIGN PATENT DOCUMENTS

2832954 2/1980 Fed. Rep. of Germany ... 400/144.2
2855338 6/1980 Fed. Rep. of Germany ...... 400/320

Primary Examiner—Paul T. Sewell
Attorney, Agent, or Firm—John A. Brady

[57] ABSTRACT

A method is provided for adjusting to an original predetermined value the natural frequency of the carrier load of a processor controlled stepper motor driving said carrier through a belt and pulley arrangement. The adjustment is performed by having the microprocessor move said carrier back and forth repetitively, at a rate based on the original natural frequency value and by adjusting the belt tension for obtaining maximum amplitude vibrations of the carrier load.

14 Claims, 7 Drawing Figures

STEPPER MOTOR LOAD TUNING

FIELD OF INVENTION

This invention deals with a method for tuning a stepper motor load driven through a belt and pulley arrangement and more particularly for doing the same in a processor controlled motor environment.

BACKGROUND OF THE INVENTION

Stepper motors are often used to drive mechanical loads through a belt and pulley transmission system. Such an arrangement is used for instance for moving a typewriter/printer print carrier from one print position to the next. Proper printing may only be achieved through precise carrier positioning. This is particularly true with open loop systems in which no feedback position control is provided, which means that any incorrect carrier positioning would result in subsequently repeated improperly positioned printings.

Generally, the stepper motor is controlled through a processor using prestored escapement algorithms specifically developed for a designed typewriter/printer. These algorithms are based on a number of parameters among which load related parameters, such as stepper motor load natural frequency are most critical. The load natural frequency is predetermined for a designed machine but varies while the machine is being operated mainly due to belt tension variations, and in production of the machine due to carrier mass variations and belt spring rate variations. Therefore, adjustments are always required to bring that natural frequency back to the original value for which the escapement algorithms where determined when the machine is in use. A commonly used method for performing load natural frequency adjustment or tuning involves using weighting gauges. The maintenance engineer adjusts the belt tension for a given belt dip to be provided by the gauge set at a predetermined belt position. In addition to the burden of having the engineer carry around an additional tool and to any problems involved in accessing the specific belt position, the mentioned method lacks precision for not taking into consideration parameters other than belt tension measurement per se.

SUMMARY OF THE INVENTION

The present invention enables more precise stepper motor load natural frequency adjustments.

In addition, this invention will enable performing in the field precise tuning of a typewriter/printer stepper motor load natural frequency using a multipurpose conventional tool, e.g., a screwdriver.

According to the invention, a method is provided for properly adjusting the load natural frequency of a processor controlled stepper motor driving said load through a belt and pulley arrangement, by driving said stepper motor for repetitive back and forth rotations about a position at a predetermined rate; and, adjusting the belt tension, while the stepper motor is being driven, for oscillation of said load at maximum amplitude.

DETAILED DESCRIPTION OF PREFERRED EMBODIMENT

Figure 1:
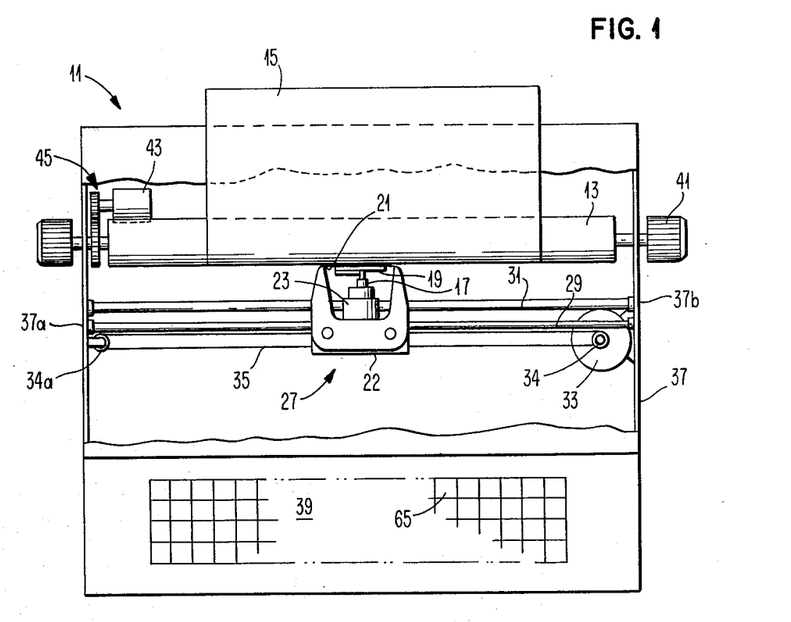
FIG. 1 is a perspective sketch of a typewriter/printer.

Referring now to the drawings, and more particularly to FIG. 1 thereof, a perspective sketch of a typewriter/printer 11 is shown.

Typewriter/printer 11, includes a platen 13 about which a print receiving medium such as a sheet of paper 15 may be wrapped to receive printing thereon. Printing is effected when the hammer unit 17 is actuated to force a selected type petal of the daisy wheel typefont 19 to strike the ink ribbon 21 which in turn strikes paper 15 creating an image. The ink ribbon is provided by a ribbon cartridge 22. The selection motor 23 effects character selection by rotating to effect the positioning of a selected type petal of the typefont 19 adjacent to the hammer unit 17.

The selection motor 23, ribbon 21, typefont 19 and hammer unit 17 are mounted on a print carrier 27 which moves over fixed guide rails 29 and 31 in a direction which parallels the length of the platen 13. A carrier motor 33 effects the rotation of its output pulley 34 thereby effecting motion of a belt 35 which is wrapped thereabout. The belt 35 is connected to the print carrier 27 causing its corresponding motion along the length of the platen 13 between two extreme positions 37a and 37b. Both the selection motor 23 and the carrier motor 33 are stepper motors.

A frame 37 supports the fixed guide rails 29, 31 and the platen 13. The typewriter/printer may also include a keyboard 39 which is also supported by the frame 37. The platen 13 may be rotated manually upon rotation of the platen knob 41 or automatically by a drive motor 43 connected to a gear train 45.

In operation, feeding the carrier motor 33 with signals provided by electronic and logic control circuitry (see FIG. 2) causes the carrier motor 33 to drive the belt 35 and move the print carrier 27 from left to right or vice versa along a print line direction and from one print position to the next. While the print carrier 27 is being shifted, the type font 19 is also rotated about its axis by the selection motor 23 for character selection purposes.

From the above, it is obvious that any misplacement of the carrier being moved along the platen would result in misaligned printing.

The two stepper motors, i.e., the selection motor 23 and the carrier motor 33 (see FIG. 2) are driven by driver circuits 47 and 49 respectively. The driver circuits 47 and 49 are controlled by logic and program controlled elements comprising one master microprocessor 51, two separate slave microprocessors 53 and 55 and output ports 61 and 63 respectively. The slave microprocessors 53 and 55 are mainly devoted to controlling the movements of the selection motor 23 and the carrier motor 33 respectively while the master microprocessor 51 also controls other functions not directly related to the invention. The slave microprocessors 53, 55 may be Intel 8741 microprocessors and the master microprocessor 51 may be an Intel 8085 microprocessor.

Figure 2:
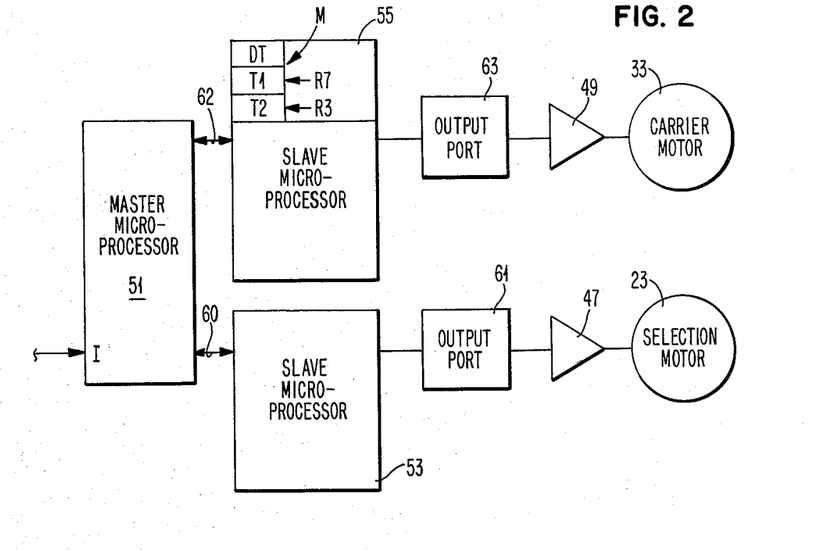
FIG. 2 is a view of the electronic control circuitry for the typewriter/printer.

In operation, any order which requests the move of either or both of the motors 23 or 33 during its execution is detected and reported to the master microprocessor 51 as a command applied to the status and data input I of said master microprocessor 51. The master microprocessor 51 identifies the command, defines the function to be performed and assigns specific jobs to the slave microprocessors 53 and/or 55. The master microprocessor 51 is also kept aware of the evolution of the functions being performed by the slave microprocessors 53 and or 55, in order to be able to synchronize these functions with each other. Also, whenever one of the slave microprocessors 53, 55 either needs service from the master microprocessor 51 or has completed its task and is ready for performing another job, it lets the master microprocessor 51 know that it needs attention, in a conventional manner. For instance, a level raised on one of the lines of the corresponding bi-directional buses 60 or 62 will notify the master microprocessor 51 about the attention needed from its part, at a predetermined level of priority depending upon the characteristics of the help needed. The master microprocessor 51 will then establish connections with the concerned slave microprocessor 53 or 55 in due time, through one of the bi-directional buses 60 or 62.

Let's refer now to FIGS. 1 and 2. In normal typing operation the depressing of a character key 65 on the printer keyboard 39 is reported to the master microprocessor 51 through its status and data input I as a specific command detected and identified by the master microprocessor 51. Prior to any effective impact printing operation, the print carrier 27 has to be moved along the platen 13 to face the correct print position on the sheet of paper 15. This job is devoted to the slave microprocessor 55 controlling the carrier motor 33. In addition, the daisy wheel typefont 19 has to be rotated to present the selected petal to face the hammer unit 17. This function is devoted to the slave microprocessor 53 which controls the selection motor 23. The operations of both slave microprocessor 53 and 55 are initiated and synchronized by the master microprocessor 51. In other words, the stepper motors 23 and 33 are each individually controlled by a specific slave microprocessor 53 or 55, but both microprocessors are in turn controlled by the master microprocessor 51.

The typewriter represented on the above mentioned FIGS. 1 and 2 operates on an open-loop type of arrangement. In other words no sensing device is used for sensing the actual position of any of the motor driven mechanical loads. For instance, no sensing device is used to sense the actual position of carrier 27. The master microprocessor 51 and slave microprocessor 55 both assume that any move order they carried out to the motor 33 has been correctly executed. Thus, any misplacement of the carrier 27 could propagate throughout subsequent printing and affect several printed characters or tabs. This remark emphasizes the need for adequate carrier escapement control. Escapements are performed using algorithms prestored in the slave microprocessor 55 memory and developed based on the characteristics of the carrier motor 33 load, i.e., carrier 27, and of the power transmission elements mainly represented by the belt 35 and pulleys 34 and 34a. Consequently, any modification of the belt 35 tension would result in wrong escapement performance and therefore would lead to carrier 27 misplacements and bad printing.

Figure 3:
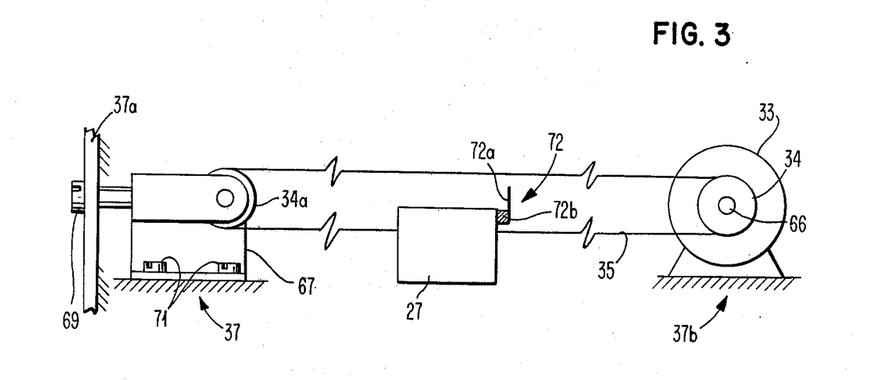
FIGS. 3 and 4 are schematic representations of the system to be tuned.

Referring now to FIG. 3, a schematic view of the carrier motor 33 and load, i.e., carrier 27, arrangement with the power transmission elements such as the belt 35 and pulleys 34 and 34a is represented. The carrier stepper motor 33 is grounded to the right hand side 37b of the frame 37. A drive pulley 34 is connected to the motor 33 shaft 66 with the belt 35 wrapped about it. The belt 35 is also wrapped about the pulley 34a which is connected to a belt tension adjusting bracket 67. A Tension adjusting screw 69 is used for adjusting the belt 35 tension by laterally moving the bracket 67 perpendicularly with respect to the side 37a of frame 37. The belt tension is normally secured through use of two hold-down screws 71 attaching the belt tension adjusting bracket to the frame 37. Lateral movement of carrier load 27 between the two pulleys 34 and 34a is provided by the carrier stepper motor 33 driving the belt 35 and pulleys 34 and 34a.

During normal operating conditions of a typewriter/printer, the belt tension varies and the predetermined electrical signals provided by its processors and circuits to effect carrier load 27 movement do not continue to perform their function correctly. Maintenance people must then readjust the carrier 27 driving system. Present adjusting methods involve setting a weighting gauge at a predetermined belt 35 position and acting upon the tension adjusting screw 69 until the belt tension is adjusted for a given dip at the gauge location. This technique has disadvantages since the maintenance engineer needs to carry the above mentioned gauge tool. Further, the method is not precise because it does not take into account other parameters involved in the carrier 27 motion. Bearing in mind that most of said parameters (including belt tension) define the so called load natural frequency, one may then understand that any adjusting method acting directly upon tuning said natural frequency to its original value should be preferable to the above mentioned gauge adjusting technique, and this is what the invention method intends to perform: direct tuning of the load natural frequency.

Figure 4:
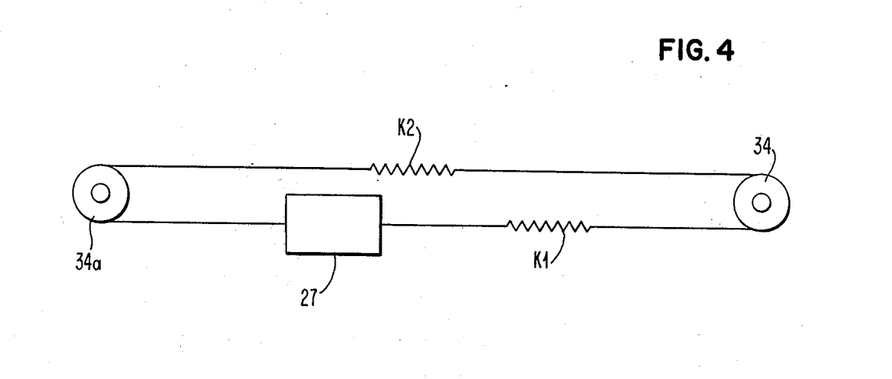

The natural frequency is, as shown below, a function of effective spring rate and effective mass.

$$Fn = \frac{1}{2\pi}\sqrt{\frac{K}{M}}$$

where
Fn: natural frequency
K: effective belt spring rate
M: effective carrier mass Now, for the system as shown in FIG. 3, the belt can be modeled as in FIG. 4. The springs K1 and K2 act in parallel and therefore the equivalent spring rate is $K = K1 + K2$. This of course holds only for the case when neither belt section goes slack. If for any reason the K1 belt section becomes slack ($K1 = 0$) the effective effective spring rate drops from $K = K1 + K2$ to $K = K2$, with the natural frequency dropping from $$Fn = \frac{1}{2\pi}\sqrt{\frac{K1 + K2}{M}}, \text{ to } Fn_1 = \frac{1}{2\pi}\sqrt{\frac{K2}{M}}$$

In practice, the natural frequency varies with belt tension, between Fn and $Fn_1$.

The system can be readjusted to its nominal operating conditions by readjusting the belt tension to bring the natural frequency Fn back to its original value. A method of adjustment through natural frequency tuning would not only be more precise than the previously used methods, but, in addition, with the system architecture of the machine represented in FIGS. 1 and 2 it could be provided at almost no extra cost. The following additional technical consideration will make the above statement more readily understandable.

Figure 5:
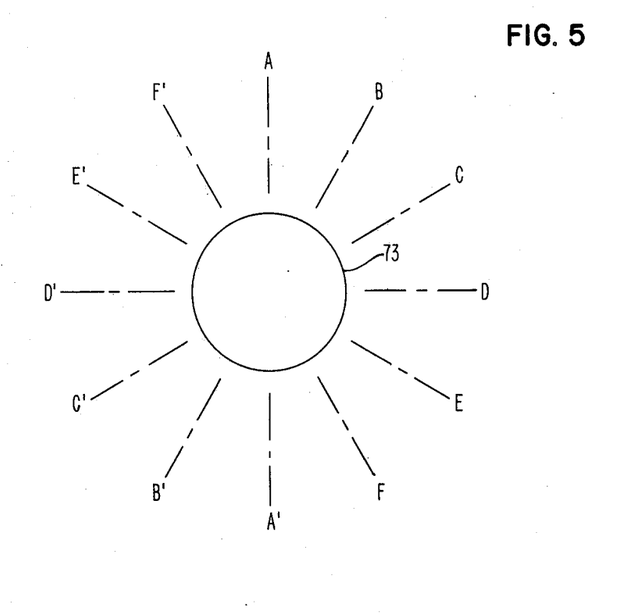
FIGS. 5 and 6 are schematic representations of the carrier stepper motor of said typewriter/printer.
Figure 6:
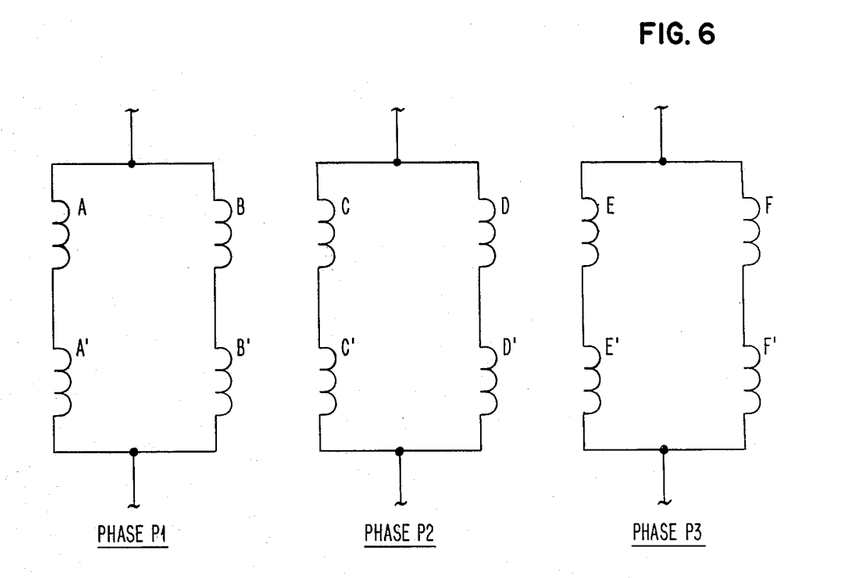

The carrier motor 33 is a 3-phase, 12 pole, 210 step variable reluctance stepper motor. The 12 poles designated by A, B, C, D, E, F, A', B', C', D', E', and F' are physically located as represented in FIG. 5, and electrically connected in series-parallel arrangement as represented in FIG. 6 to provide the three motor phases P1, P2 and P3. For normal carrier driving operation, the carrier motor 33 rotation on a step by step basis is achieved by energizing, in other words by connecting to a d.c. power supply (not represented), two out of the three phases P1, P2 and P3 according to a predetermined sequence. This sequence is defined by a phase table T1 stored in a location M of the slave microprocessor 55 (FIG. 2). Also stored in another location of the same memory M is a second phase table T2 for half step rotations of the carrier motor 33. These tables T1 and T2 are represented as shown below:

|  | T1 | | | T2 | | | |
| --- | --- | --- | --- | --- | --- | --- | --- |
|  | P1 | P2 | P3 | P1 | P2 | P3 | |
| (R7) Pointer | 1 | 1 | 0 | 1 | 1 | 0 | Pointer (R3) |
|  | 0 | 1 | 1 | 0 | 1 | 0 | |
|  | 1 | 0 | 1 | 0 | 1 | 1 | |
|  |  |  |  | 0 | 0 | 1 | |
|  |  |  |  | 1 | 0 | 1 | |
|  |  |  |  | 1 | 0 | 0 | |

The phase table T1 includes three columns, one for each of the phase coils P1, P2 and P3 and three rows. The phase table T2 includes the same three columns P1, P2 and P3 and six rows. In normal operation, the stepper motor 33 rotor 73 (schematically represented by a circle in FIG. 5) is made to rotate on a step by step basis, i.e., by increments of $(360/210)=1.714$ degree, by energizing, i.e., connecting to a power source not shown, the phases coil(s) of a row pointed at by a pointer R7 (contents of register R7 within the slave microprocessor 55), whenever a binary one is stored at the pointed location of table T1.

A continuous motor move is performed by having a microprogram also stored in the slave microprocessor 55 memory M move the pointer R7 cyclically from one row to the next downward and by going back to the first row after reaching the last table row. Half step move rotations are performed similarly but involve table T2 and pointer Y3 instead. In addition, proper acceleration and speed profiles to be achieved for performing specific stepper motor 33 moves more efficiently are achieved by delaying the shifting operations of the involved pointer R3 or R7, by a predetermined delay. Accordingly, for each type of specific move made available to the typewriter/printer system, a specific delay table is also stored in a memory location DT of the slave microprocessor 55. Operation of the stepper motor 33 also needs conversion of the logic signals provided by the slave microprocessor 55 into energy, using the driver circuit 49 (see FIG. 2).

Figure 7:
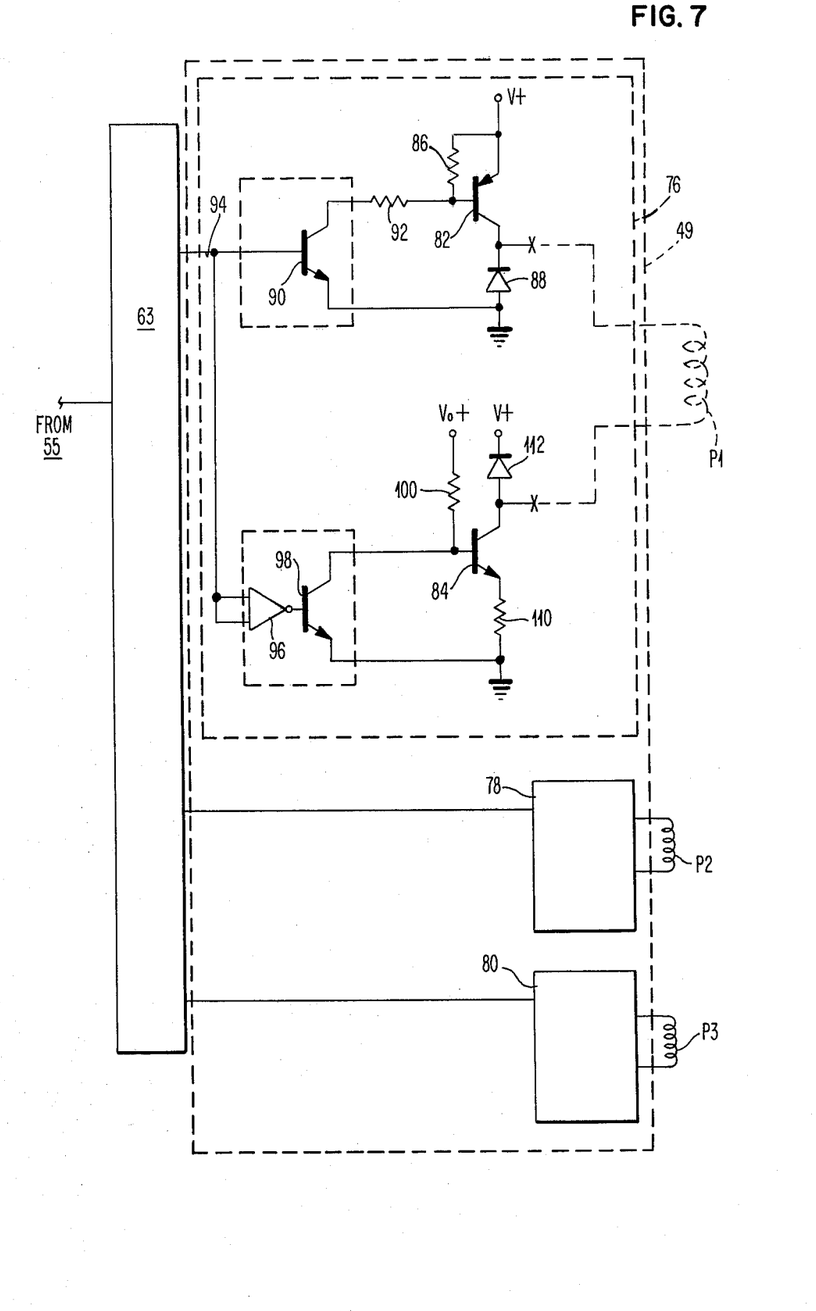
FIG. 7 is a driver circuit for said carrier stepper motor.

Referring now to FIG. 7, an arrangement of the driver circuit 49 (see FIG. 2) is represented. The driver circuit 49 is made of three identical power circuits 76, 78, 80, one for each of the phase coils P1, P2 and P3.

The power circuit 76 is shown in detail in FIG. 7. The phase coil(s) P1 is connected between the collector electrodes of a PNP transistor 82 and an NPN transistor 84. The emitter electrode of transistor 82 is connected to a power supply V+, and also to the base electrode of the same transistor 82 through a resistor 86. The collector electrode of transistor 82 is connected to ground through a diode 88. The base electrode of transistor 82 is connected to the collector electrode of an NPN transistor 90 through a resistor 92. The emitter electrode of transistor 90 is connected to ground. The base electrode of transistor 90 is connected to the output 94 of port 63. This same output 94 of port 63 is also connected, through an inverter 96, to the base electrode of an NPN transistor 98. The emitter electrode of transistor 98 is connected to ground. Its collector electrode is connected to the base electrode of transistor 84. The same base electrode of transistor 84 is also connected to a power supply Vo+ to through a resistor 100. The emitter electrode of transistor 84 is connected to ground through a resistor 110. The collector electrode of transistor 84 is connected to the power supply V+ through a diode 112. Darlington amplifiers could conveniently be used in lieu of transistors 82 and 84.

In operation, when a logic up level is provided on the output 94 of the port 63, which port is in fact part of the slave microprocessor 55, the open collector outputs of transistors 90 and 98 are respectively turned low and high. Transistors 82 and 84 are both switched on into saturation. This enables energizing the phase coil P1 by providing a current path from the V+ d.c. source through transistor 82, the phase coil P1, transistor 84 and resistor 110 to ground. The phase coil P1 is thus energized and such energization will be maintained as long as the logic level on the output 94 is maintained on, which means also at least as long as the pointer R3 or R7 (see FIG. 2) involved is not moved. When the logic level on the output 94 of port 63 is turned down, transistors 82 and 84 are switched off. During this part of the cycle, some of the energy present in the phase coil P1 field is returned to the V+ d.c. power supply via current flow through the now forward biased diodes 88 and 112.

For the purpose of the natural frequency adjusting function, an additional delay DT1, equal to 10 ms has been stored into the delay table DT of memory M in the slave microprocessor 55. Also stored into the same memory M is a microprogram such as that set forth at the end of the specification using Intel microprocessor 8741 language) which will be used for performing the natural frequency adjustment function. This function will be performed by driving the carrier motor 33 through the following test routine repetitively for driving said motor 33 back and forth about its actual rest position after the carrier 27 has been driven to a given central point, e.g., middle way between the left (37a) and right (37b) sides of the frame 37:

(1) Drive motor 33 for ½ step move forward for 10 ms delay.
(2) Repeat (1).
(3) Drive motor 33 for ½ step move backward for 10 ms.
(4) Repeat (3).
(5) Go back to (1).

The 10 ms value has been derived from the normal natural frequency $F=1/T$ of the system including the carrier 27, belt 35, the pulleys 34, 34a and associated elements such as tension adjusting bracket 67, which frequency was F=25 Hz for the preferred embodiment.

To enter the typewriter/printer machine into the natural frequency adjustment mode, the maintenance engineer would first bring the carrier to the central point using the keyboard and then operate a test switch (not shown) added for that purpose on the machine and connected to the command input I of the master microprocessor 51. During normal operation, the master microprocessor is made to cyclically test its input I and execute the operations requested, in accordance with the flow diagram of set forth at the end of the specification. If the signal on input I indicates that the test switch is open, the master microprocessor 51 will look for a system command and eventually execute such a command. In the contrary, upon detection of a command on input I indicating that the test switch is closed, the system would enter into the test routine.

The execution of the test routine generates a set of pulses which are converted by the driver circuit 49 into electrical signals for driving cyclically the stepper motor 33 back and forth about rest position at a frequency of 25 Hz and therefore $T=1/F=40$ ms. This oscillation of the motor is transmitted to carrier 27, pulleys 34 and 34a through the belt, and maintained until the test switch is opened. Using a simple screwdriver the maintenance engineer will then adjust the belt 35 tension. He starts by untightening the screws 71 and 69, thus loosening one end of the belt 35. Then he tightens the tension adjusting screw 69 slowly while watching at the carrier load being oscillated back and forth by the carrier motor 33. As the tension adjusting screw 69 is turned clockwise, the tension adjusting bracket is moved to the left (see FIG. 3) tightening the belt 35, and the amplitude of the oscillations of the carrier 27 starts increasing, reaches a maximum and then decreases. The screw 69 is turned counterclockwise and adjusted to the position at which the maximum amplitude oscillation of the carrier 27 occurs. The hold down screws 71 are then tightened and the test switch turned off. The tuning process is completed.

The occurrence of the maximum amplitude oscillation (vibration) of the carrier load might be inconvenient to detect with a good precision. Several means may be provided for helping the maintenance engineer detecting the occurrence of the maximum amplitude vibration of the load carrier, e.g., by adding visualizing means such as a mechanically vibrating means or pendulum 72 made of a leaf spring 72a attached to a piece of magnet 72b which could just be magnetically stuck to the carrier 27 when needed. The pendulum would be made such that its natural frequency would also be 25 Hz.

The algorithm on which the carrier motor 33 natural frequency adjustment routine is based, is derived empirically. In other words, the development method used by the manufacturer to determine the delay to be stored into DT1 is reverse of that stated above. That is, the desired belt 35 tension is first set on a model typewriter/printer, then the carrier motor 33 is moved back and forth as with the test routine, but the delay is changed through the software until the carrier oscillation is a maximum. The only requirement is that the initial oscillation be relatively slow and the frequency is increased to the maximum to assure that the frequency found is the fundamental frequency and not a harmonic. The determined delay is then saved by being stored in the DT1 location of the memory M of the typewriter/printer.

While the invention has been particularly shown and described with reference to the preferred embodiments thereof, it will be understood by those skilled in the art, that changes in form and details may be made therein without departing from the spirit and scope of the invention.

The microprogram for causing stepper motor oscillation is as follows:

| | | | Comments |
|---|---|---|---|
| START | MOV | R3,PTINIT | Delay value = delay |
| | MOV | R1,Delay value | stored in DT1 |
| | | | divided by 80, loaded |
| | | | into register R1 of |
| | | | slave microprocessor |
| | | | 55. |
| SHAKE | CALL | HSFWD | |
| | CALL | SYSOUTSTP | |
| | CALL | HSFWD | |
| | CALL | SYSOUTSTP | |
| | CALL | HSREV | |
| | CALL | SYSOUTSTP | |
| | CALL | HSREV | |
| | CALL | SYSOUTSTP | |
| | JMP | SHAKE | |
| HSFWD | MOV | A,R3 | ½ step forward. |
| | XRL | A,PTTOP | If phase table |
| | | | pointer is |
| | JZ | F1 | not at top |
| | | | of phase table. |
| | INC | R3 | Then increment |
| | | | pointer |
| | RET | | |
| F1 | MOV | R3,PTINIT | Else set pointer |
| | | | to bottom. |
| | RET | | Return. |
| HSREV | MOV | A,R3 | |
| | SRL | A,PTINIT | If phase table |
| | | | pointer is |
| | JZ | R1 | not at |
| | | | bottom of table. |
| | DEC | R3 | Then decrement |
| | | | pointer. |
| | RET | | |
| R1 | MOV | R3,PTTOP | Else set |
| | | | pointer to top. |
| | RET | | Return. |
| SYSOUTSTP | MOV | A,R3 | Get new phase |
| | | | and output to |
| | MOVP | A,@A | motor; |
| | OUTL | P1,A | |
| | | | Load and start timer; |
| | MOV | A,R1 | |
| | MOV | T,A | |
| | STRT | CNT | |
| | | | Wait for timer |
| SYZOSWAI | JTF | SYZOSSTP | to expire; |
| | JMP | SYZOSWA1 | |
| | | | Stop timer and return; |
| SYZOSSTYP | STOP | TCNT | |
| | RET | | |

The master microprocessor flow diagram for entering the routine for tuning the stepper motor load is as follows:

What is claimed is:

1. A method for adjusting the natural frequency of a stepper motor driving a load through a belt and pulley arrangement, said method including:
generating electrical signals for driving said stepper motor back and forth about a position, at a predetermined rate;
feeding said stepper motor with said electrical signals;
adjusting the belt tension for obtaining oscillation of said load at maximum amplitude; and,
securing said belt at the adjusted belt tension position.

2. The method of claim 1 wherein said adjusting step is performed starting with a loose belt, varying the belt tension progressively to the tension providing the maximum amplitude load oscillations.

3. A method for adjusting the natural frequency of a processor controlled stepper motor driving a load through a belt and pulley arrangement, wherein said processor is program controlled, said method including:
generating an electrical signal for driving said stepper motor back and forth about a position, at a predetermined rate, using a prestored microprogram within said processor;
feeding said stepper motor with said electrical signal;
adjusting the belt tension for obtaining maximum amplitude oscillation of said load; and,
securing said belt at the adjusted belt tension position.

4. A method for adjusting substantially to an original value the natural frequency of a programmed processor controlled stepper motor usable for driving a load back and forth between two extreme positions using a belt and pulley arrangement said method including:
driving said stepper motor for bringing said load at a given central point;
generating an electrical signal for driving said stepper motor back and forth at a predetermined rate, using a prestored microprogram within said processor;
feeding said stepper motor with said electrical signal;
loosening the belt at one of said extreme positions;
progressively tuning the belt tension by tightening and loosening said belt until obtaining oscillations of said load at maximum amplitude; and
securing said belt at the tension providing said maximum amplitude oscillations.

5. A system for adjusting substantially to an original value the natural frequency of a processor controlled stepper motor driving a load through a belt and pulley arrangement, said system including:
a source of electrical signals;
means for connecting said source of electrical signals to said stepper motor wherein said stepper motor is made to oscillate back and forth at a predetermined rate;
means connected to said belt for adjusting the belt tension for obtaining a maximum amplitude vibration of said load connected to the back and forth oscillating stepper motor through said belt; and,
means for securing said belt tension at the value providing said maximum amplitude.

6. A system according to claim 5 wherein said load is also provided with detecting means for detecting the maximum amplitude vibration of said load.

7. A system according to claim 6 wherein said detecting means is a pendulum having a natural frequency equal to the natural frequency being adjusted.

8. A system according to claim 7 wherein said pendulum is provided with a magnet for being stuck to the load.

9. A system according to claim 5, 6 or 7 wherein said source of electrical signals is controlled by a microprogram stored into said processor.

10. In a typewriter/printer having a print carrier load movable along a platen through a belt and pulley arrangement connected to a processor controlled stepper motor, a system for adjusting the belt tension by tuning the natural frequency of the stepper motor load and belt pulley arrangement, said system comprising:
means for driving said print carrier to a given central point;
a source of electrical signals;
means for connecting said source of electrical signals to said stepper motor wherein said stepper motor is made to oscillate back and forth at a predetermined rate and vibrate the print carrier through the belt and pulley arrangement;
means connected to said belt for adjusting the belt tension for obtaining a maximum amplitude vibration of said print carrier; and,
means for securing said belt tension at the value providing said maximum amplitude vibration of the print carrier.

11. In a typewriter/printer according to claim 10, said system also comprising a pendulum attached to said print carrier, said pendulum having a natural frequency equal to the natural frequency being tuned.

12. In a typewriter/printer according to claim 10, said source of electrical signal comprising a program controlled microprocessor.

13. A stepper motor load tuning system in a typewriter/printer comprising:
a platen;
a print carrier load movable along said platen;
a stepper motor connected to said print carrier load for moving said print carrier load along said platen, through a belt and pulley arrangement;
microprocessor means connected for controlling said stepper motor;
means for controlling said microprocessor means for driving said stepper motor whereby said print carrier load is moved to a given position along said platen;

means for loosening said belt tension;

prestored means connected to said microprocessor means for controlling said microprocessor means for driving said stepper motor whereby said stepper motor is made to oscillate back and forth at a given rate and vibrate the print carrier through the belt and pulley arrangement;

means connected to said belt for adjusting said belt tension for a maximum amplitude vibration of said print carrier;

means for visualizing said maximum amplitude vibration; and means for securing said belt tension at the value providing said maximum amplitude vibration of the print carrier.

14. A system according to claim 13 wherein said means for visualizing said maximum amplitude vibration comprises a pendulum attached to said print carrier.

* * * * *